United States Patent
Boyapati et al.

(10) Patent No.: US 10,341,228 B1
(45) Date of Patent: Jul. 2, 2019

(54) RSVP MAKE-BEFORE-BREAK LABEL REUSE

(71) Applicant: Juniper Networks, Inc., Sunnyvale, CA (US)

(72) Inventors: Suresh Kumar Boyapati, Sunnyvale, CA (US); Devendra Dilip Kulkarni, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 122 days.

(21) Appl. No.: 15/473,431

(22) Filed: Mar. 29, 2017

(51) Int. Cl.
*H04L 12/723* (2013.01)
*H04L 12/46* (2006.01)
*H04L 12/741* (2013.01)

(52) U.S. Cl.
CPC .......... *H04L 45/50* (2013.01); *H04L 12/4633* (2013.01); *H04L 45/745* (2013.01)

(58) Field of Classification Search
CPC ..... H04L 45/50; H04L 45/502; H04L 45/507; H04L 45/52; H04L 45/54; H04L 45/745; H04L 12/4633
See application file for complete search history.

(56) References Cited

U.S. PATENT DOCUMENTS

| | | | |
|---|---|---|---|
| 8,077,726 B1 | 12/2011 | Kumar et al. | |
| 8,310,957 B1 | 11/2012 | Rekhter | |
| 8,681,637 B2 | 3/2014 | Vigoureux et al. | |
| 9,071,541 B2 | 6/2015 | Atlas et al. | |
| 9,253,250 B2 | 2/2016 | Asati et al. | |
| 2003/0063613 A1 | 4/2003 | Carpini et al. | |
| 2003/0137971 A1* | 7/2003 | Gibson | H04L 45/50 370/351 |
| 2005/0169266 A1 | 8/2005 | Aggarwal et al. | |
| 2011/0063972 A1* | 3/2011 | Muley | H04L 12/1877 370/225 |

(Continued)

FOREIGN PATENT DOCUMENTS

WO 2010023511 A1 3/2010

OTHER PUBLICATIONS

Notice of Allowance from U.S. Appl. No. 14/675,338, dated Aug. 23, 2017, 10 pp.

(Continued)

*Primary Examiner* — Habte Mered
(74) *Attorney, Agent, or Firm* — Shumaker & Sieffert, P.A.

(57) ABSTRACT

Techniques are described for reusing downstream-assigned labels when establishing a new label switched path (LSP) between an ingress router and an egress router prior to tearing down an existing LSP using make-before-break (MBB) procedures for the Resource Reservation Protocol (RSVP). In one example, a router receives, a first message requesting establishment of an LSP including a tunnel identifier pair. The router compares the tunnel identifier pair for the requested LSP to existing LSP information stored at the router. Based on a determination that the tunnel identifier pair for the requested LSP is the same as a tunnel identifier pair for an existing LSP, the router assigns a label used by the router to identify incoming traffic associated with the requested LSP that is the same as a previously allocated label for the existing LSP without updating labels in a forwarding table of a forwarding plane of the router.

20 Claims, 3 Drawing Sheets

(56) References Cited

U.S. PATENT DOCUMENTS

| | | | |
|---|---|---|---|
| 2011/0182186 A1* | 7/2011 | Vigoureux | H04L 12/4633 370/241.1 |
| 2012/0257886 A1 | 10/2012 | Sun et al. | |
| 2013/0232193 A1* | 9/2013 | Ali | H04L 67/42 709/203 |
| 2013/0286846 A1 | 10/2013 | Atlas et al. | |
| 2014/0348028 A1* | 11/2014 | Chen | H04L 12/437 370/258 |
| 2016/0261494 A1 | 9/2016 | Dai et al. | |
| 2016/0294683 A1 | 10/2016 | Shen et al. | |

OTHER PUBLICATIONS

Notice of Allowance from U.S. Appl. No. 14/682,799, dated Aug. 14, 2017, 5 pp.

Awduche et al., "RSVP-TE: Extensions to RSVP for LSP Tunnels," Network Working Group Internet Draft, draft-ietf-mpls-rsvp-lsp-tunnel-09.txt, Aug. 2001, 64 pp.

Awduche et al., "RSVP-TE: Extensions to RSVP for LSP Tunnels," Network Working Group, RFC 3209, The Internet Society, Dec. 2001, 61 pp.

Berger, "Generalized Multi-Protocol Label Switching (GMPLS) Signaling Resourece ReserVation Protocol-Traffic Engineering (RSVP-TE) Extensions," Network Working Group, The Internet Society, Jan. 2003, 42 pp.

Dai et al., "MPLS RSVP-TE MBB Label Reuse," Network Working Group Internet Draft, draft-dai-mpls-rsvp-te-mbb-label-reuse-00, Mar. 9, 2015, 7 pp.

Pan et al. "Fast Reroute Extensions to RSVP-TE for LSP Tunnels" Network Working Group, RFC 4090, May 2005, 38 pgs.

Braden et al., "Resorce ReSerVation Protocol (RSVP)—Version 1 Message Processing Rules," Network Working Group, RFC 2209, Sep. 1997, 25 pp.

U.S. Appl. No. 14/675,338 by Shen et al., filed Mar. 31, 2015.

Prosecution History from U.S. Appl. No. 14/682,799, dated from Mar. 15, 2017 through Jul. 3, 2017, 17 pp.

Prosecution History from U.S. Appl. No. 14/675,338, dated from Mach 4, 2016 through May 19, 2017, 47 pp.

Notice of Allowance from U.S. Appl. No. 14/682,799, dated Nov. 8, 2017, 2 pp.

Notice of Allowance from U.S. Appl. No. 14/675,338, dated Nov. 2, 2017, 2 pp.

Bradner, "Key words for use in RFCs to Indicated Requirement Levels," RFC 2119, Network Working Group, Mar. 1997, 4 pp.

Crocker, "Augmented BNF for Syntax Specifications: ABNF," RFC 2234, Network Working Group, Nov. 1997, 15 pp.

Notice of Allowance received in U.S. Appl. No. 15/834,722, dated Sep. 10, 2018, 7 pp.

\* cited by examiner

US 10,341,228 B1

RSVP MAKE-BEFORE-BREAK LABEL REUSE

TECHNICAL FIELD

The disclosure relates to computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as a Border Gateway Protocol (BGP) or an Interior Gateway Protocol (IGP).

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute paths and establish LSPs along the paths within a network. RSVP-TE may use bandwidth availability information accumulated by an IGP link-state routing protocol, such as an Intermediate System-Intermediate System (ISIS) protocol or an Open Shortest Path First (OSPF) protocol.

Head-end routers of an LSP are commonly known as ingress routers, while routers at the tail-end of the LSP are commonly known as egress routers. Ingress and egress routers, as well as intermediate or transit routers along the LSP that support MPLS, are referred to generally as label switching routers (LSRs). The ingress router uses routing information, propagated from the egress router, to determine the LSP, to assign labels for the LSP, and to affix a label to each packet. The LSRs use MPLS protocols to receive MPLS label mappings from downstream LSRs and to advertise MPLS label mappings to upstream LSRs. When an LSR receives an MPLS packet from an upstream router, the LSR performs a lookup and swaps the MPLS label according to the information in its forwarding table based on the lookup and forwards the packet to the appropriate downstream LSR. The egress router removes the label from the packet and forwards the packet to its destination in accordance with non-label based packet forwarding techniques.

SUMMARY

In general, this disclosure describes techniques for reusing labels when establishing a new label switched path (LSP) between an ingress router and an egress router prior to tearing down an existing LSP using make-before-break (MBB) procedures for the Resource Reservation Protocol (RSVP).

In one example, a routing engine of a non-ingress router receives a Path message requesting establishment of a new LSP from an upstream router. The Path message includes a tunnel identifier pair (i.e., a Tunnel Identifier and an Extended Tunnel identifier) that uniquely identifies the requested LSP. The routing engine compares the tunnel identifier pair for the requested LSP with tunnel identifier pairs for existing LSPs of the router. If the tunnel identifier pair for the requested LSP is the same as a tunnel identifier pair for an existing LSP, then the router determines that it may reuse a label previously allocated for the existing LSP as the label for the requested LSP where the paths of the existing LSP and the requested LSP overlap. In the case where the previously allocated label is reused, the non-ingress router does not need to update labels for a label route stored in its forwarding table for the reused label. In addition, the ingress router of the LSP may avoid updating an ingress route stored in its forwarding table for applications that use the LSP. Furthermore, the disclosed techniques use already-existing infrastructure and do not require modification of existing routers or addition of additional data structures to the MBB procedures. The disclosed techniques may reduce or avoid network churn due to a large number of label route updates during the RSVP MBB procedures.

In one example, this disclosure describes a method including: receiving, by a router and from an upstream router, a first message requesting establishment of a label switched path (LSP), wherein the first message includes a tunnel identifier pair including a tunnel identifier and an extended tunnel identifier used to uniquely identify the requested LSP; comparing, by the router, the tunnel identifier pair for the requested LSP to existing LSP information stored at the router, the existing LSP information including tunnel identifier pairs for one or more existing LSPs; and based on a determination that the tunnel identifier pair for the requested LSP is the same as one of the tunnel identifier pairs for one of the existing LSPs, assigning, by the router, a label used by the router to identify incoming traffic associated with the requested LSP that is the same as a previously allocated label for the one of the existing LSPs having the same tunnel identifier pair as the requested LSP.

In another example, this disclosure describes a router configured to: receive, from an upstream router, a first message requesting establishment of a label switched path (LSP), wherein the first message includes a tunnel identifier pair including a tunnel identifier and an extended tunnel identifier used to uniquely identify the requested LSP; compare the tunnel identifier pair for the requested LSP to existing LSP information stored at the router, the existing LSP information including tunnel identifier pairs for one or more existing LSPs; and based on a determination that the tunnel identifier pair for the requested LSP is the same as one of the tunnel identifier pairs for one of the existing LSPs, assign a label used by the router to identify incoming traffic associated with the requested LSP that is the same as a previously allocated label for the one of the existing LSPs having the same tunnel identifier pair as the requested LSP.

In another example, this disclosure describes a non-transitory computer-readable medium including instruction that, when executed, cause one or more processors of a router to: receive, from an upstream router, a first message requesting establishment of a label switched path (LSP), wherein the first message includes a tunnel identifier pair including a tunnel identifier and an extended tunnel identifier used to uniquely identify the requested LSP; compare the tunnel identifier pair for the requested LSP to existing LSP information stored at the router, the existing LSP information including tunnel identifier pairs for one or more existing LSPs; and based on a determination that the tunnel identifier pair for the requested LSP is the same as one of the tunnel identifier pairs for one of the existing LSPs, assign a label used by the router to identify incoming traffic associated with the requested LSP that is the same as a previously allocated label for the one of the existing LSPs having the same tunnel identifier pair as the requested LSP.

The details of one or more examples are set forth in the accompanying drawings and the description below. Other features, objects, and advantages will be apparent from the description and drawings, and from the claims.

DETAILED DESCRIPTION

Figure 1:
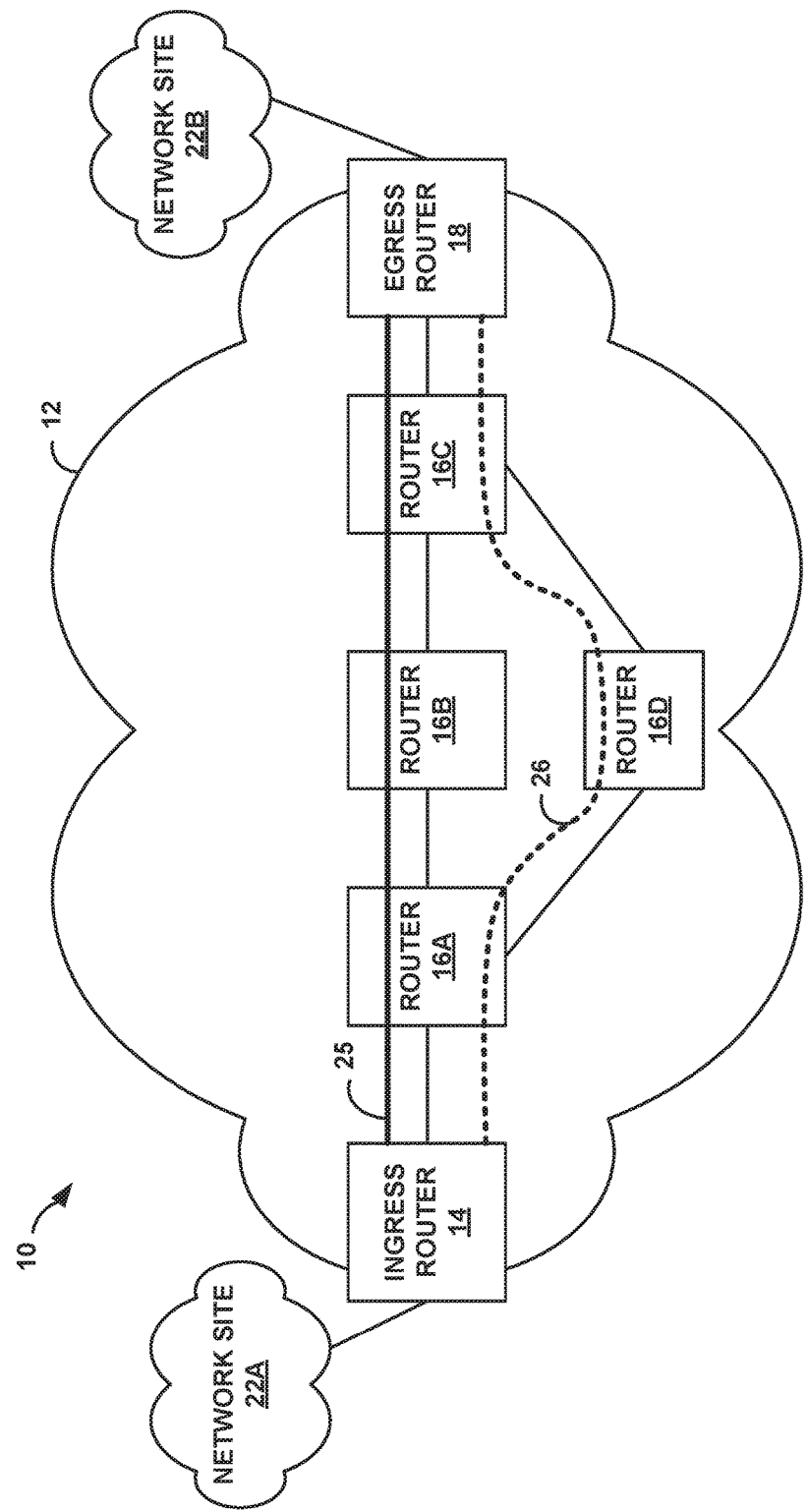
FIG. 1 is a block diagram illustrating an example system in which routers are configured to forward network traffic in accordance with the techniques of this disclosure.

FIG. 1 is a block diagram illustrating an example network system 10 in which ingress router 14, transit routers 16A-16D ("transit routers 16"), and egress router 18 of network 12 are configured to forward network traffic (e.g., network packets) in accordance with the techniques of this disclosure. In the example of FIG. 1, ingress router 14 is an ingress router of label switched path (LSP) 25 and egress router 18 is the egress router of LSP 25. Transit routers 16A, 16B and 16C are intermediate or transit routers along a first path of LSP 25 (represented as a solid line).

Routers 14, 16 and 18 represent any network device that routes or otherwise forwards traffic through network 12. Typically, routers 14, 16, 18 represent a L3 packet-switching device that operates at L3 to exchange routing information that describes a current topology of network 12 using a routing protocol, such as an Interior Gateway Protocol (IGP) or a Border Gateway Protocol (BGP). Routers 14, 16, 18 then process this routing information, selecting paths through its representation of the topology of network 12 to reach all available destinations to generate forwarding information. In other words, routers 14, 16, 18 reduce these paths to so-called "next hops" which identify interfaces to which to forward packets destined for a particular destination, where the forwarding information includes this list of next hops. Routers 14, 16, 18 then install this forwarding information in a forwarding table of a forwarding plane of the router, whereupon the forwarding plane forwards received traffic in accordance with the forwarding information.

Network 12 may comprise an Internet Protocol (IP) network that uses Multi-Protocol Label Switching (MPLS) protocols to engineer traffic patterns over an MPLS core of the IP network. By utilizing MPLS, ingress router 14 and egress router 18 can request distinct paths, i.e., label switched paths (LSPs), through network 12 to carry packets between customers or subscribers in remote network sites 22A-22B ("network sites 22"). A label associated with a particular LSP, e.g., LSP 25, is affixed to the packets that travel through network 12 via LSP 25. Transit routers 16 along the path cooperatively perform MPLS operations to forward the packets along the established LSP 25. A variety of protocols exist for establishing LSPs, e.g., the Label Distribution Protocol (LDP) and the Resource Reservation Protocol with Traffic Engineering extensions (RSVP-TE).

In some examples, network 12 may be a service provider network. For example, network 12 may represent one or more networks owned and operated by a service provider (which is commonly a private entity) that offer one or more services for consumption by customers or subscribers in network sites 22. In this context, network 12 is typically a layer three (L3) packet-switched network that provides L3 connectivity between a public network, such as the Internet, and one or more network sites 22. Often, this L3 connectivity provided by service provider network 12 is marketed as a data service or Internet service, and subscribers in network sites 22 may subscribe to this data service. Network 12 may represent a L3 packet-switched network that provides data, voice, television and any other type of service for purchase by subscribers and subsequent consumption by the subscribers in network sites 22.

Network sites 22 may be local area networks (LANs), wide area networks (WANs), or other private networks that include a plurality of subscriber devices (not shown). In some examples, network sites 22 may comprise distributed network sites of the same customer enterprise. In other examples, network sites 22 may belong to different entities. Subscriber devices within network sites 22 may include personal computers, laptops, workstations, personal digital assistants (PDAs), wireless devices, network-ready appliances, file servers, print servers or other devices capable of requesting and receiving data via network 12. While not shown in the example of FIG. 1, network system 10 may include additional service provider networks, subscriber networks and other types of networks, such as access networks, private networks, or any other type of network.

As described herein, routers 14, 16, 18 use RSVP-TE to establish LSP 25. For example, ingress router 14 sends an RSVP Path message towards egress router 18 requesting establishment of LSP 25. The RSVP Path message includes a label request object that requests transit routers 16 and egress router 18 to provide a label for LSP 25. The RSVP Path message also includes a session object associated with LSP 25 that aids in session identification and diagnostics. In some examples, the session object includes a tunnel identifier pair (i.e., the Tunnel Identifier and Extended Tunnel Identifier) used to uniquely identify a traffic engineered (TE) tunnel and the one or more LSPs included within the TE tunnel. In some cases, the RSVP Path message may include an explicit route object (ERO) that specifies the first path of first LSP 25 between ingress router 14 and egress router 18. If one of transit routers 16 receives the RSVP Path message propagated downstream from ingress router 14 and is incapable of providing the requested label (e.g., cannot satisfy admission control requirements of first LSP 25), the transit router sends a PathErr message to ingress router 14. If the label request object included in the RSVP Path message is not supported end to end along the path of LSP 25, ingress router 14 will be notified by the first one of transit routers 16 that does not provide support.

Egress router 18 of first LSP 25 receives the RSVP Path message for first LSP 25 and responds to the label request object in the RSVP Path message by including a label object in its response RSVP Resv message. Egress router 18 sends the RSVP Resv message back upstream towards ingress router 14 following the path state created by the RSVP Path message in reverse order. Each of transit routers 16 along the first path of first LSP 25 receives the RSVP Resv message including a label object from a next hop router, and uses the received label to identify outgoing traffic associated with first LSP 25. Each of transit routers 16 along the first path of first LSP 25 then allocates a new label, places that label in the corresponding label object of the RSVP Resv message, and sends the RSVP Resv message upstream towards ingress router 14. The label sent upstream in the label object of the RSVP Resv message from a given one of transit routers 16, e.g., transit router 16B, is the label that transit router 16B will use to identify incoming traffic associated with first LSP 25. Transit router 16B can then program its forwarding plane based on the received label and the allocated label for first LSP 25 in order to map incoming labeled packets to a next hop label forwarding entry. When the RSVP Resv message reaches ingress router 14, LSP 25 is effectively established.

One of the requirements for traffic engineering is the capability to reroute an established LSP under a number of conditions based on administrative policy. For example, in some cases, an administrative policy may dictate that a given LSP be rerouted when a more optimal route becomes available. In another case, a given LSP may be rerouted when admission control requirements for the LSP change. A common admission control requirement change is a bandwidth requirement change, especially with a widely implemented auto-bandwidth feature that adjusts LSP bandwidth automatically based on feedback from traffic monitoring. In a further case, a given LSP may be rerouted upon failure of a resource, e.g., a node or a link, along an established path of the LSP. In general, it is highly desirable not to disrupt traffic or adversely impact network operations while rerouting an existing LSP. This rerouting requirement necessitates establishing a new LSP and transferring traffic from an existing LSP onto the new LSP before tearing down the existing LSP. This concept is referred to as make-before-break (MBB).

A problem may arise in MBB procedures, however, because the existing LSP and the new LSP may compete with each other for resources on network segments that the LSPs have in common, i.e., overlap. Depending on the availability of resources, this competition can cause admission control to prevent the new LSP from being established. For RSVP to support MBB procedures, it is necessary that, on links that are common between the existing and new LSPs, resources used by the existing LSP should not be released before traffic is transitioned to the new LSP, and resource reservations should not be counted twice between the existing LSP and the new LSP because this might cause admission control to reject the new LSP.

In order to perform a reroute of LSP 25, ingress router 14 selects a new LSP II) and sends a new RSVP Path Message towards egress router 18 using the session object, including the same tunnel identifier pair, as LSP 25 and a new explicit route object (ERO) to define a new path for a new LSP 26 (represented as a dotted line). During establishment of second LSP 26, ingress router 14 continues to use first LSP 25 and refresh the RSVP Path message for LSP 25. On links that do not overlap between first LSP 25 and second LSP 26, the new RSVP Path message is treated as a conventional new LSP setup. On links that do overlap between first LSP 25 and second LSP 26, the shared session object allows second LSP 26 to be established using resources that are shared with first LSP 25. Once ingress node 14 receives a RSVP Resv message for second LSP 26, the second LSP 26 is established. Ingress router 14 then transitions traffic to second. LSP 26, and tears down first LSP 25 using RSVP MBB procedures. For additional details of the RSVP MBB procedures, see D. Awduche, "RSVP-TE: Extensions to RSVP for LSP Tunnels," Network Working Group RFC 3209, December 2001, the entire contents of which are incorporated by reference herein.

In the current RSVP MBB procedures, described in more detail in RFC 3209, downstream label assignment behavior of the non-ingress routers for new LSPs is not well defined. As a general practice, each non-ingress router along the path of the new LSP assigns a new and different label for the new LSP. In this case, there is a completely separate LSP for the new LSP end to end, with the exception of penultimate hop popping (PIP) in which the new LSP shares the implicit/explicit null label with the existing LSP for the last segment of the LSP. The new and different labels for each LSP allow end to end path verification for each LSP independently. The new and different labels for each LSP, however, also require each non-ingress router along the path of the new LSP to perform a label route add in a forwarding table of its forwarding plane to associate the newly allocated label with the LSP, and subsequently perform a label route delete in the forwarding table of its forwarding plane to remove the existing label associated with the LSP. In addition, the ingress router of the LSP performs ingress route updates in its forwarding plane when switching to the new LSP. For example, the ingress router updates applications that use the LSP in order to transmit traffic according the new ingress route that associates a different outgoing label with the new LSP. The ingress route updates performed by the ingress router may also cause other elements of the network, which are dependent on the LSP, to perform updates.

According to the techniques of the disclosure, a router 16 or egress router 18 may reuse labels when establishing a new LSP 26 to replace LSP 25 between ingress router 14 and egress router 18 prior to tearing down LSP 25 using make-before-break (MBB) procedures for the Resource Reservation Protocol (RSVP). In one example, a routing engine of one of transit routers 16 or egress router 18 receives a Path message from an upstream router that requests establishment of a new LSP 26. The Path message includes a session object that uniquely defines a traffic-engineered (TE) tunnel that includes one or more LSPs, sometimes referred to as LSP tunnels. The session object includes a tunnel identifier pair, i.e., a Tunnel Identifier and an Extended Tunnel Identifier, that uniquely identifies the TE tunnel. In some examples, the Tunnel Identifier is a 16-bit identifier used in the session object that remains constant over the life of the tunnel or LSP. In some examples, the Tunnel Identifier is a 16-bit identifier used in the session object that remains constant over the life of the tunnel or LSP. In further examples, the Extended Tunnel Identifier is a 32-bit identifier used in the session object that remains constant over the life of the tunnel of LSP. While the Extended Tunnel Identifier normally may be set to all zeros, in some examples the Extended Tunnel Identifier may be set to an Internet Protocol (IP) address of an ingress node of the TE tunnel to narrow the scope of the session object to an ingress-egress router pair. In this way, the Tunnel Identifier and Extended Tunnel Identifier together function as a globally unique identifier of the TE tunnel and the one or more LSPs included in the TE tunnel.

The routing engine of routers 16, 18 compares the tunnel identifier pair for the requested LSP 26 with tunnel identifier pairs for a plurality of existing LSPs of each router 16, 18, such as a tunnel identifier pair for existing LSP 25. If the tunnel identifier pair for the requested LSP 26 is the same as a tunnel identifier pair for an existing LSP, then the routing engine determines that a label has already been allocated for the existing LSP and may be reused, rather than generating a new label for requested LSP 26 and updating the forwarding table of the forwarding plane of the router 16, 18.

Thus, where the routing engine of a given router determines that the tunnel identifier pair for the requested LSP 26 and the existing LSP 25 are the same, the routing engine determines that the existing LSP 25 and the requested LSP 26 overlap at least at that given router. Accordingly, the routing engine of routers 16, 18 may reuse a label previously allocated for the existing LSP 25 as a label for the requested LSP 26 at the routers where the paths of the existing LSP 25 and the requested LSP 26 overlap.

As an illustration of the above, with respect to the example of FIG. 1, router 16A receives, from ingress router 14, a Path message requesting establishment of new LSP 26. The Path message further includes a tunnel identifier pair for requested LSP 26. Router 16A compares the tunnel identifier pair for requested LSP 26 with tunnel identifier pairs for existing LSPs of router 16A. Router 16A determines that the tunnel identifier pair for requested LSP 26 is the same as a tunnel identifier pair for existing LSP 25. Thus, router 16A determines that it may reuse a label previously allocated for existing LSP 25 as a label for requested LSP 26. Router 16A then sends the label previously allocated for existing LSP 25 as the label for LSP 26 in a Resv message for LSP 26 upstream to ingress router 14. Thus, upon subsequent tear-down of existing LSP 25 and establishment of new LSP 26, ingress router 14 forwards downstream traffic for LSP 26 to router 16A via the label previously allocated for existing LSP 25. Further, because router 16A reuses the label previously allocated for existing LSP 25 as the label for LSP 26, router 16A does not need to update its forwarding table with a new label for LSP 26.

As a further illustration of the above, with respect to the example of FIG. 1, router 16C receives, from router 16D, a Path message requesting establishment of new LSP 26. The Path message further includes a tunnel identifier pair for requested LSP 26. Router 16C compares the tunnel identifier pair for requested LSP 26 with tunnel identifier pairs for existing LSPs of router 16C. Router 16C determines that the tunnel identifier pair for requested LSP 26 is the same as a tunnel identifier pair for existing LSP 25. Thus, router 16C determines that it may reuse a label previously allocated for existing LSP 25 as a label for requested LSP 26. Router 16C then sends the label previously allocated for existing LSP 25 as the label for LSP 26 in a Resv message upstream to router 16D. Thus, upon subsequent tear-down of existing LSP 25 and establishment of new LSP 26, router 16I) forwards downstream traffic for LSP 26 to router 16C via the label previously allocated for existing LSP 25. Further, even though router 16C previously provided the label allocated for existing LSP 25 to router 16B, router 16C may provide the same label to router 16D because the transit router, i.e., router 16C, is the same for both LSP 25 and LSP 26. Further, because router 16C reuses the label previously allocated for existing LSP 25 as the label for LSP 26, router 16C does not need to update its forwarding table with a new label for LSP 26.

Where the routing engine of a given router determines that the tunnel identifier pair for the requested LSP 26 is not the same as any tunnel identifier pair for existing LSPs of the routing engine, the routing engine determines that the paths of the existing LSP 25 and the requested LSP 26 do not overlap at that given router. In the case where the paths of the existing LSP 25 and the requested LSP 26 do not overlap at the router, the routing engine allocates a new label for the requested LSP 26 that is different than any of the previously allocated labels for the existing LSPs. The routing engine then sends the newly allocated label in a Resv message upstream to an upstream router for use in forwarding traffic for the requested LSP 26 downstream to the router.

As an illustration of the above, with respect to the example of FIG. 1, router 16D receives, from router 16A, a Path message requesting establishment of new LSP 26. The Path message further includes a tunnel identifier pair for requested LSP 26. Router 16D compares the tunnel identifier pair for requested LSP 26 with tunnel identifier pairs for existing LSPs of router 16D. Router 16D determines that the tunnel identifier pair for requested LSP 26 is not the same as any tunnel identifier pair for existing LSPs of router 16D. Thus, router 16D determines that it may not reuse a label previously allocated for an existing LSP because the requested LSP 26 does not overlap with an LSP of router 16D. Router 16D allocates a new label for the requested LSP 26. Further, router 16D sends the newly allocated label for LSP 26 in a Resv message upstream to router 16A. Thus, upon subsequent tear-down of existing LSP 25 and establishment of new LSP 26, router 16A forwards downstream traffic for LSP 26 to router 16D via the new label. Further, because router 16D was unable to reuse a label previously allocated for an existing LSP of router 16D, router 16D updates its forwarding table with the new label for LSP 26.

Thus, as described herein, a routing engine of transit routers 16 and egress router 18 does not need to update a label route stored in a forwarding table of its forwarding plane for a reused label, but instead may keep or reuse the same labels across different LSPs 25 and 26 where possible, without affecting either routing functionalities or data path verification of each LSP 25 and 26. Such a procedure may avoid or reduce network churn caused by label route updates during the RSVP MBB procedures. In addition, the ingress router 14 of the LSP may avoid updating an ingress route stored in a forwarding table of its forwarding plane for applications that use the LSP. Furthermore, the disclosed techniques use already-existing infrastructure and do not require additional modification of routing engine of routers 14, 16, 18. In addition, the disclosed techniques may reduce or avoid network churn due to a large number of label route updates during the RSVP MBB procedures. For example, keeping or reusing labels according to the disclosed techniques may speed up establishment of the new LSP due to not needing to wait for label route and ingress route updates and forwarding plane programming at each router along the path of the new LSP.

In some circumstances, it may be necessary for ingress router 14 or transit routers 16 to update a forwarding table of its forwarding plane to include a new next hop for requested LSP 26 even though the router reuses the label previously allocated for the existing LSP 25 as the label for requested LSP 26. This may occur, as one example, where an interface of the router used for existing LSP 25 has insufficient bandwidth to establish the new LSP 26. In this case, ingress router 14, for example, may send a Path message to router 16A requesting establishment of LSP 26 on an interface that is different than that of existing LSP 25. Router 16A still reuses the label previously allocated for the existing LSP 25 as a label for the requested LSP 26 and sends the reused label upstream to ingress router 14A in the Resv message for LSP 26. In such an example, upon receipt of the Resv message including the reused label for LSP 26 from router 16A, ingress router 14 updates its forwarding table to associate the reused label with the new interface information (i.e., the new next hop) for LSP 26. While in this specific circumstance, ingress router 14 may experience some churn due to forwarding plane updates during RSVP MBB procedures, the techniques of the disclosure may allow router 16 to conserve label space by reusing the label previously allocated for the existing LSP 25 as a label for the requested LSP 26.

Figure 2:
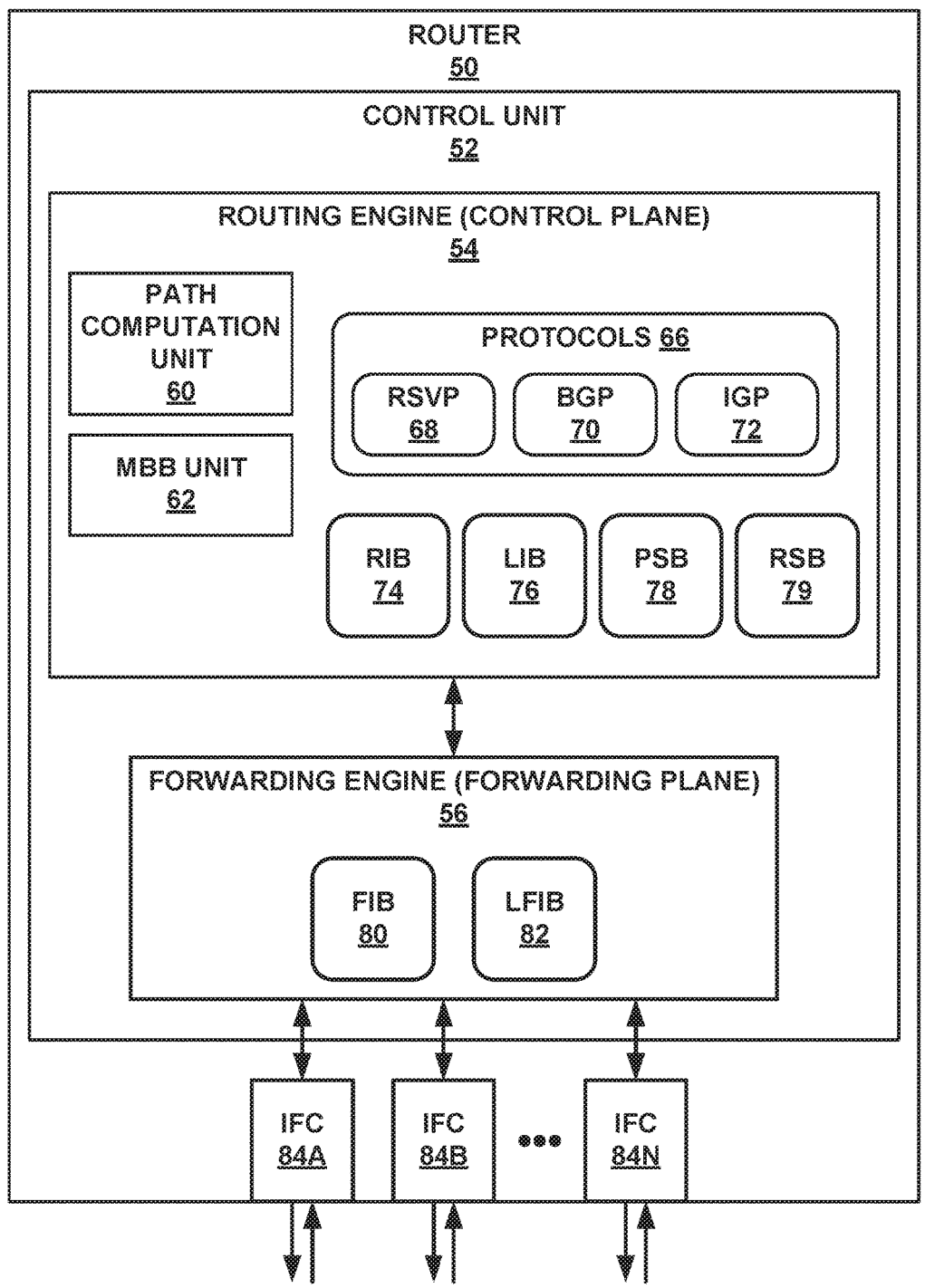
FIG. 2 is a block diagram illustrating an example of a router configured to perform the techniques of this disclosure.

FIG. 2 is a block diagram illustrating an example router 50 configured to perform the disclosed techniques of RSVP MBB label reuse. Router 50 may operate as any of ingress router 14, transit routers 16 and egress router 18 along the path of LSP 25 from FIG. 1. In the illustrated example of FIG. 2 router 50 includes a control unit 52 with a routing engine 54 that provides control plane functionality for the network device and a forwarding engine 56 that provides forwarding or data plane functionality for the network device to send and receive traffic by a set of interface cards 84A-84N ("IFCs 84") that typically have one or more physical network interface ports. Control unit 52 may include one or more daemons (not shown) that comprise user-level processes that run network management software, execute routing protocols to communicate with peer routers or switches, maintain and update one or more routing tables in routing engine 54, and create one or more forwarding tables for installation in forwarding engine 56, among other functions.

Forwarding engine 56 performs packet switching and forwarding of incoming data packets for transmission over a network. As shown in FIG. 2, forwarding engine 56 includes a forwarding information base (FIB) 80 that stores forwarding data structures associating network destinations with next hops and outgoing interfaces. Forwarding engine 56 also includes a label FIB (LFIB) 82 that stores label routes associating an incoming label for a given LSP with an outgoing label and a next hop router. Although not shown in FIG. 2, forwarding engine 56 may comprise a central processing unit (CPU), memory and one or more programmable packet-forwarding application-specific integrated circuits (ASICs).

Routing engine 54 includes various protocols 66 that perform routing functions for router 50. In the illustrated example of FIG. 2, routing engine 54 includes BGP 70 and IGP 72 as routing protocols used to exchange routing information with other routing devices in a network in order to discover the network topology and update a routing information base (RIB) 74. In the examples described in this disclosure, IGP 72 may be a link-state routing protocol such as open shortest path first (OSPF) or intermediate system-intermedia system (IS-IS). In addition, routing engine 54 includes RSVP 68, and specifically RSVP-TE, as a routing protocol used to establish traffic engineered paths, i.e., LSPs, with the other network devices in the network using RIB 74. Routing engine 54 uses RSVP 68 to exchange label mapping messages with other routing devices along the LSPs and update a label information base (LIB) 76.

RIB 74 may describe the topology of the network in which router 50 resides, and may also describe various routes within the network and the appropriate next hops for each route, i.e., the neighboring routing devices along each of the routes. Routing engine 54 analyzes the information stored in RIB 74 to generate forwarding information. Routing engine 54 then installs forwarding data structures into FIB 80 within forwarding engine 56. FIB 80 associates network destinations with specific next hops and corresponding interface ports within the forwarding plane. LIB 76 maintains mappings of next hop labels to the next hops for each route within the network from RIB 74. Routing engine 54 selects specific paths through the network and installs the next hop label mappings for the next hops along those specific paths in MB 82 within forwarding engine 56.

In some examples, routing engine 54 uses RSVP 68 to generate and maintain a traffic engineering database (TED) 78 including a complete list of nodes and links in the network that are participating in traffic engineering and a set of attributes for each of the links. For example, TED 78 may include bandwidth reservations for links associated with LSPs through the network. Routing engine 54 may use IGP 72 to advertise the traffic engineering attributes stored in TED 78 to other routing devices in the network. Routing engine 54 may also receive IGP advertisements including traffic engineering attributes from the other routing devices in the network and update TED 78.

Path State Block (PSB) 78 stores state data from RSVP Path messages for each established LSP session, PSB 78 maintains copies of each Path message, including a label request for the requested LSP session and a tunnel identifier pair for the requested LSP session. The tunnel identifier pair is included in a session object that uniquely defines a traffic engineered (TE) tunnel including one or more LSPs or LSP tunnels. Each tunnel identifier pair includes a Tunnel Identifier and an Extended Tunnel Identifier that uniquely identify the TE tunnel and the one or more LSPs within the TE tunnel. For example, the Tunnel Identifier may be a 16-bit identifier used in the session object that remains constant over the life of the tunnel or LSP. In further examples, the Tunnel Identifier is a 16-bit identifier used in the session object that remains constant over the life of the tunnel or LSP. The Extended Tunnel Identifier may be a 32-bit identifier used in the session object that remains constant over the life of the tunnel of LSP. While the Extended Tunnel Identifier normally may be set to all zeros, in some examples, the Extended Tunnel Identifier may be set to an IP address of an ingress node of the TE tunnel to narrow the scope of the session object to an ingress-egress router pair. In such an example, the Tunnel Identifier and Extended Tunnel Identifier function as a globally unique identifier.

Reservation State Block (RSB) 79 stores reservation requests for RESV messages for each established LSP session. RSB 79 maintains copies of each RESV message, including a label request for each established LSP session and a tunnel identifier pair for the requested LSP session. Additional details regarding the implementation and function of PSB 78 and RSB 79 are provided by R. Braden et al., "Resource ReSerVation Protocol (RSVP)—Version 1 Message Processing Rules," Network Working Group RFC2209, September 1997, the entire contents of which are incorporated by reference herein.

In the case where router 50 operates as ingress router 14 of an LSP, routing engine 54 uses path computation unit 60 to select a path for a new LSP between ingress router 14 and the egress of the LSP (i.e., egress router 18). For example, path computation unit 60 may use a Constrained Shortest Path First (CSPF) process to compute a shortest path for the LSP based information included in RIB 74 to satisfy admission control requirements, e.g., bandwidth requirements and other constraints, associated with the LSP. In the case where the MBB procedures where triggered due to changing admission control requirements, when CSPF is used to compute a path for the new LSP that meets the changed requirements, it is possible that the path of the existing LSP 25 is still one of the best paths that satisfy the changed requirements. This occurrence provides the opportunity to reuse labels as described in this disclosure. MBB unit 62 in routing engine 54 may perform the RSVP MBB procedures to establish the new LSP 26 before tearing down existing LSP 25.

According to the techniques of the disclosure, control unit 52 of router 50 may reuse labels when establishing new LSP 26 between ingress router 14 and egress router 18 prior to tearing down an existing LSP 25 using make-before-break (MBB) procedures for the Resource Reservation Protocol (RSVP). In one example, control unit 52 of router 50 receives a Path message from an upstream router that requests establishment of a new LSP, e.g., requested LSP 26 from FIG. 1. The Path message includes a tunnel identifier pair (i.e., a Tunnel Identifier and an Extended Tunnel Identifier) that uniquely identifies the requested LSP 26.

Control unit 52 compares the tunnel identifier pair for the requested LSP 26 with tunnel identifier pairs for existing LSPs of router 50 stored in PSB 78. In some examples, control unit 52 determines whether, for each of the existing LSPs, the Tunnel identifier and the Extended Tunnel Identifier specified by the Path message for the requested LSP 26 is the same as a Tunnel Identifier and an Extended Tunnel Identifier stored within PSB 78 for an existing LSP specified by a previous Path message. In further examples, control unit 52 determines whether the Tunnel Identifier and the Extended Tunnel Identifier specified by a Resv message for the requested LSP 26 received from a downstream router is the same as a Tunnel Identifier and an Extended Tunnel Identifier stored within RSB 79 for an existing LSP specified by a RSVP Resv message.

In yet further examples, control unit 52 performs multiple comparisons of the tunnel identifier pair. For example, control unit 52 first determines whether the Tunnel identifier and the Extended Tunnel Identifier specified by the Path message for the requested LSP 26 is the same as a Tunnel Identifier and an Extended Tunnel Identifier stored within PSB 78 for an existing LSP specified by a previous Path message. Upon determining that the Tunnel Identifier and the Extended Tunnel Identifier specified by the Path message for the requested LSP 26 is the same as the Tunnel Identifier and the Extended Tunnel Identifier stored within PSB 78 for the existing LSP, control unit 52 determines whether the Tunnel Identifier and the Extended Tunnel Identifier specified by the Resv message for the requested LSP 26 is the same as a Tunnel Identifier and an Extended Tunnel Identifier stored within RSB 78 for an existing LSP specified by a previous RSVP Resv message.

If the tunnel identifier pair for the requested LSP 26 is the same as at least one tunnel identifier pair for at least one existing LSP of router 50, then control unit 52 determines that it may reuse a label previously allocated for the existing LSP as the label for the requested LSP 26. Accordingly, based on a determination that the tunnel identifier pairs for requested LSP 26 and existing LSP 25 are the same, control unit 50 assigns a label for requested LSP 26 that is the same as a label for existing LSP 25. Further, control unit 50 provides the label to an upstream router for use by the upstream router in forwarding downstream traffic for the requested LSP to router 50 via the label.

If, however, the tunnel identifier pair for the requested LSP 26 is not the same as at least one tunnel identifier pair for at least one existing LSP of router 50, then control unit 52 determines that it may not reuse a previously allocated label for the requested LSP 26. Based on determination that the tunnel identifier pairs for requested LSP 26 is unique for router 50, control unit 52 allocates a new label for requested LSP 26 from a pool of unallocated labels. Further, control unit 52 provides the new label to an upstream router for use by the upstream router in forwarding downstream traffic for the requested LSP to router 50 via the label.

Thus, where control unit 52 of router 50 determines that the tunnel identifier pair for the requested LSP 26 and existing LSP 25 are the same, control unit 52 determines that the paths of the existing LSP 25 and the requested LSP 26 overlap at router 50. Accordingly, control unit 52 may reuse a label previously allocated for the existing LSP 25 as a label for the requested LSP 26. Where control unit 52 determines that the tunnel identifier pair for the requested LSP 26 and the existing LSP 25 are not the same, control unit 52 determines that the paths of the existing LSP 25 and the requested LSP 26 do not overlap at router 50. Accordingly, control unit 52 allocates a new label for the requested LSP 26.

In this way, control unit 52 does not need to update a label route stored in FIB 80 of its forwarding plane 56 for a reused label, but instead may keep or reuse the same labels across different LSPs 25 and 26 where possible, without affecting either routing functionalities or data path verification of each LSP 25 and 26. Such a procedure may avoid or reduce network churn caused by label route updates during the RSVP MBB procedures. Furthermore, the disclosed techniques use already-existing infrastructure and do not require additional modification of router 50. In addition, the disclosed techniques may reduce or avoid network churn due to a large number of label route updates to the forwarding table of forwarding plane 56 during the RSVP MBB procedures. For example, keeping or reusing labels according to the disclosed techniques may speed up establishment of the new LSP due to not needing to wait for control unit 52 to perform label route and ingress route updates and forwarding plane programming where LSPs 25 and 26 are the same. In some circumstances in which requested LSP 26 cannot be established on the same interface of router 50 as existing LSP 25 due to bandwidth limitations, control unit 52 may need to update its forwarding table to include a new next hop for LSP 26 even when a reused label is assigned to LSP 26.

Figure 3:
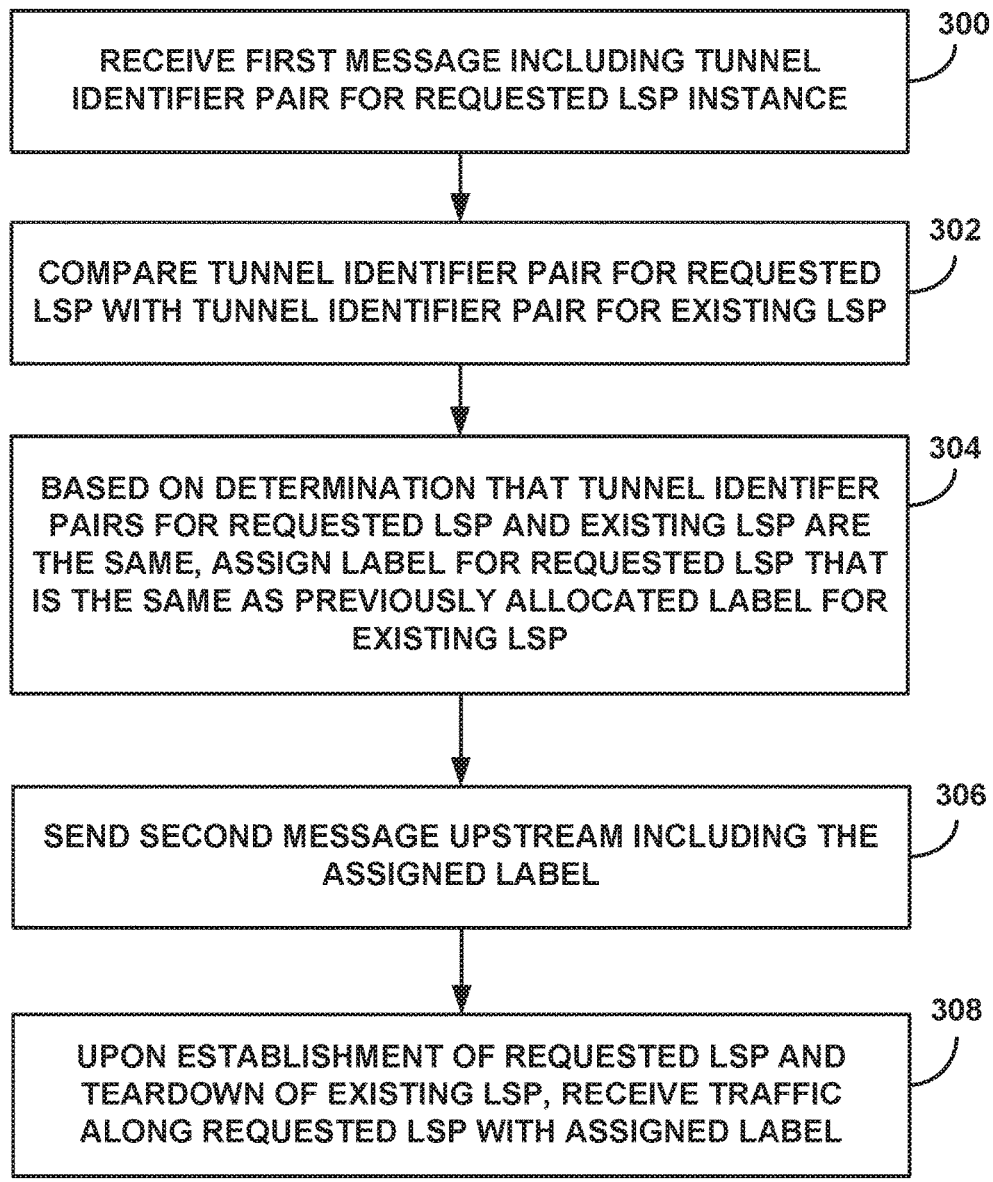
FIG. 3 is a flowchart illustrating an example operation of a router configured to forward network traffic in accordance with the techniques of this disclosure.

FIG. 3 is a flowchart illustrating an example operation of a router configured to forward network traffic in accordance with the techniques of this disclosure. The example operation of FIG. 3 is described with respect to router 50 from FIG. 2 when operating as a transit or egress router of an LSP. In other examples, the operation of FIG. 3 may also be performed by one of transit routers 16 and egress router 18 of LSP 25 from FIG. 1.

Control unit 52 of router 50 receives, via inbound links of IFCs 84, a first message from an upstream router of an LSP (300). In the example of FIG. 3, the first message is a Path message requesting establishment of a new LSP 26 and includes a tunnel identifier pair (i.e., a Tunnel Identifier and an Extended Tunnel Identifier) that uniquely identifies the new LSP 26.

Control unit 52 compares the tunnel identifier pair for the requested LSP 26 with tunnel identifier pairs for existing LSPs stored by forwarding plane 56 of router 50 (302). In some examples, control unit 52 determines whether, for each existing LSP of router 50, the Tunnel Identifier and the Extended Tunnel Identifier specified by the Path message for the requested LSP 26 is the same as a Tunnel Identifier and an Extended Tunnel identifier stored within PSB 78 for an existing LSP specified by a previous Path message. In further examples, control unit 52 determines whether the Tunnel Identifier and the Extended Tunnel Identifier specified by a Resv message for the requested LSP 26 is the same as a Tunnel Identifier and an Extended Tunnel Identifier stored within RSB 79 for an existing LSP specified by a previous RSVP Resv message.

In yet further examples, control unit 52 performs multiple comparisons of the tunnel identifier pair. For example, control unit 52 first determines whether the Tunnel Identifier and the Extended Tunnel Identifier specified by the Path message for the requested LSP 26 is the same as a Tunnel Identifier and an Extended Tunnel Identifier stored within PSB 78 for an existing LSP specified by a previous Path message. Upon determining that the Tunnel identifier and the Extended Tunnel identifier specified by the Path message for the requested LSP 26 is the same as the Tunnel Identifier and the Extended Tunnel Identifier stored within PSB 78 for the existing LSP, control unit 52 determines whether the Tunnel Identifier and the Extended Tunnel Identifier specified by a Resv message for the requested LSP 26 is the same as a Tunnel Identifier and an Extended Tunnel Identifier stored within RSB 78 for an existing LSP specified by a previous RSVP Resv message.

If the tunnel identifier pair for the requested LSP 26 is the same as the tunnel identifier pair for at least one existing LSP, then control unit 52 determines that it may reuse a label previously allocated for the existing LSP as the label for the requested LSP 26. Accordingly, based on a determination that the tunnel identifier pairs for requested LSP 26 and existing LSP 25 are the same, control unit 50 assigns a label for requested LSP 26 that is the same as a previously allocated label for existing LSP 25 (304).

However, if the tunnel identifier pair for the requested LSP 26 is not the same as the tunnel identifier pair for existing LSP 25, then control unit 52 determines that it may not reuse the label previously allocated for existing LSP 25 as the label for the requested LSP 26. Based on determination that the tunnel identifier pairs for requested LSP 26 and existing LSP 25 are not the same, control unit 50 allocates a new label for requested LSP 26 from a pool of unallocated labels.

Upon assigning a label to requested LSP 26, control unit 52 sends, via outbound links of IFCs 84, a second message to the upstream router including the assigned label for requested LSP 26 (306). The second message is a Resv message that includes the assigned label for requested LSP 26. Upon subsequent establishment of requested LSP 26 and teardown of existing LSP 25, the upstream router forwards network traffic for the requested LSP to router 50 via the label. Control unit 52 of router 50 receives the network traffic from the upstream router along the requested LSP 26 with the assigned label (308).

Thus, prior to tearing down existing LSP 25 using MBB procedures for the RSVP, control unit 52 does not need to update a label route stored in a forwarding table of forwarding plane 56 for a reused label. Instead, control unit 52 may keep or reuse the same labels across different LSPs 25 and 26 where possible, without affecting either routing functionalities or data path verification of each LSP 25 and 26. Such a procedure may avoid or reduce network churn caused by a large number of label route updates during the RSVP MBB procedures. For example, keeping or reusing labels according to the disclosed techniques may speed up establishment of the new LSP due to not needing to wait for label route and ingress route updates and forwarding plane programming at each router along the path of the new LSP. In addition, control unit 52 of ingress router 14 of the LSP may avoid updating an ingress route stored in its forwarding plane for applications that use the LSP. Furthermore, the disclosed techniques use already-existing infrastructure and do not require additional modification of routing engine 54 of router 50. In some circumstances in which requested LSP 26 cannot be established on the same interface of router 50 as existing LSP 25 due to bandwidth limitations, control unit 52 may need to update its forwarding table to include a new next hop for LSP 26 even when a reused label is assigned to LSP 26.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
    receiving, by a router and from an upstream router, a first message requesting establishment of a label switched path (LSP), wherein the first message includes a tunnel identifier pair comprising a tunnel identifier and an extended tunnel identifier used to uniquely identify the requested LSP;
    comparing, by the router, the tunnel identifier pair for the requested LSP to existing LSP information stored at the router, the existing LSP information including tunnel identifier pairs for one or more existing LSPs; and based on a determination that the tunnel identifier pair for the requested LSP is the same as one of the tunnel identifier pairs for one of the existing LSPs, assigning, by the router, a label used by the router to identify incoming traffic associated with the requested LSP that is the same as a previously allocated label for the one of the existing LSPs having the same tunnel identifier pair as the requested LSP.

2. The method of claim 1, wherein assigning the label for the requested LSP comprises assigning the label for the requested LSP to be the same as the previously allocated label for the one of the existing LSPs without updating labels in a forwarding table at the router, wherein the forwarding table already includes the previously allocated label for the one of the existing LSPs having the same tunnel identifier pair as the requested LSP.

3. The method of claim 1, further comprising:
sending, by the router and to the upstream router, a second message including the assigned label for the requested LSP;
upon establishment of the requested LSP and tear down of the one of the existing LSPs having the same tunnel identifier pair as the requested LSP, receiving, by the router and from the upstream router along the requested LSP, traffic including the assigned label; and
forwarding, by the router and to a downstream router along the requested LSP, the traffic according to a forwarding table at the router based on the assigned label.

4. The method of claim 1, wherein the requested LSP comprises a requested first LSP and the assigned label for the requested first LSP comprises a first label, the method further comprising:
receiving, by the router and from the upstream router, a third message requesting establishment of a second LSP, wherein the third message includes a tunnel identifier pair used to uniquely identify the requested second LSP;
comparing, by the router, the tunnel identifier pair for the requested second LSP to the existing LSP information stored at the router, the existing LSP information including the tunnel identifier pairs for the one or more existing LSPs including the requested first LSP; and
based on a determination that the tunnel identifier pair for the requested second LSP is not the same as any of the tunnel identifier pairs for the existing LSPs, allocating, by the router, a second label used to identify incoming traffic associated with the requested second LSP, wherein the second label is different than any previously allocated labels for any of the existing LSPs including the first label for the requested first LSP; and
updating, by the router, a forwarding table at the router to include the second label for the requested second LSP.

5. The method of claim 1, wherein comparing the tunnel identifier pair for the requested LSP to the existing LSP information stored at the router comprises comparing the tunnel identifier pair included in the first message for the requested LSP to the tunnel identifier pairs for the one or more existing LSPs stored within a path state block at the router.

6. The method of claim 5, further comprising:
receiving, by the router and from a downstream router, a second message including the tunnel identifier pair used to uniquely identify the requested LSP and a downstream-assigned label used by the router to identify outgoing traffic associated with the requested LSP; and
comparing the tunnel identifier pair included in the second message for the requested LSP to the existing LSP information stored at the router, the existing LSP information including the tunnel identifier pairs for the one or more existing LSPs stored within a reservation state block at the router.

7. The method of claim 1, further comprising receiving, by the router and from a downstream router, a second message including the tunnel identifier pair used to uniquely identify the requested LSP and a downstream-assigned label used by the router to identify outgoing traffic associated with the requested LSP, wherein comparing the tunnel identifier pair for the requested LSP to the existing LSP information stored at the router comprises comparing the tunnel identifier pair included in the second message for the requested LSP to the tunnel identifier pairs for the one or more existing LSPs stored within a reservation state block of the router.

8. The method of claim 1, wherein the tunnel identifier pair is part of a session object that defines a traffic engineered tunnel that includes the requested LSP and the one of the existing LSPs, and wherein the extended tunnel identifier is an address of an ingress router of the traffic engineered tunnel.

9. A router comprising at least one hardware-based processor configured to:
receive, from an upstream router, a first message requesting establishment of a label switched path (LSP), wherein the first message includes a tunnel identifier pair comprising a tunnel identifier and an extended tunnel identifier used to uniquely identify the requested LSP;
compare the tunnel identifier pair for the requested LSP to existing LSP information stored at the router, the existing LSP information including tunnel identifier pairs for one or more existing LSPs; and
based on a determination that the tunnel identifier pair for the requested LSP is the same as one of the tunnel identifier pairs for one of the existing LSPs, assign a label used by the router to identify incoming traffic associated with the requested LSP that is the same as a previously allocated label for the one of the existing LSPs having the same tunnel identifier pair as the requested LSP.

10. The router of claim 9, wherein, to assign the label for the requested LSP, the processor is further configured to assign the label for the requested LSP to be the same as the previously allocated label for the one of the existing LSPs without updating labels in a forwarding table at the router, wherein the forwarding table already includes the previously allocated label for the one of the existing LSPs having the same tunnel identifier pair as the requested LSP.

11. The router of claim 9, wherein the processor is further configured to:
send, to the upstream router, a second message including the assigned label for the requested LSP;
upon establishment of the requested LSP and tear down of the one of the existing LSPs having the same tunnel identifier pair as the requested LSP, receive, from the upstream router along the requested LSP, traffic including the assigned label; and
forward, to a downstream router along the requested LSP, the traffic according to a forwarding table at the router based on the assigned label.

12. The router of claim 9, wherein the requested LSP comprises a requested first LSP and the assigned label for the requested first LSP comprises a first label, and the processor is further configured to:
    receive, from the upstream router, a third message requesting establishment of a second LSP, wherein the third message includes a tunnel identifier pair used to uniquely identify the requested second LSP;
    compare the tunnel identifier pair for the requested second LSP to the existing LSP information stored at the router, the existing LSP information including the tunnel identifier pairs for the one or more existing LSPs including the requested first LSP; and
    based on a determination that the tunnel identifier pair for the requested second LSP is not the same as any of the tunnel identifier pairs for the existing LSPs, allocate a second label used to identify incoming traffic associated with the requested second LSP, wherein the second label is different than any previously allocated labels for any of the existing LSPs including the first label for the requested first LSP; and
    update a forwarding table at the router to include the second label for the requested second LSP.

13. The router of claim 9, wherein, to compare the tunnel identifier pair for the requested LSP to the existing LSP information stored at the router, the processor is further configured to compare the tunnel identifier pair included in the first message for the requested LSP to the tunnel identifier pairs for the one or more existing LSPs stored within a path state block at the router.

14. The router of claim 13, wherein the processor is further configured to:
    receive, from a downstream router, a second message including the tunnel identifier pair used to uniquely identify the requested LSP and a downstream-assigned label used by the router to identify outgoing traffic associated with the requested LSP; and
    compare the tunnel identifier pair included in the second message for the requested LSP to the existing LSP information stored at the router, the existing LSP information including the tunnel identifier pairs for the one or more existing LSPs stored within a reservation state block at the router.

15. The router of claim 9, wherein the processor is further configured to receive, from a downstream router, a second message including the tunnel identifier pair used to uniquely identify the requested LSP and a downstream-assigned label used by the processor to identify outgoing traffic associated with the requested LSP, wherein comparing the tunnel identifier pair for the requested LSP to the existing LSP information stored at the router comprises comparing the tunnel identifier pair included in the second message for the requested LSP to the tunnel identifier pairs for the one or more existing LSPs stored within a reservation state block of the router.

16. The router of claim 9, wherein the tunnel identifier pair is part of a session object that defines a traffic engineered tunnel that includes the requested LSP and the one of the existing LSPs, and wherein the extended tunnel identifier is an address of an ingress router of the traffic engineered tunnel.

17. A non-transitory computer-readable medium comprising instruction that, when executed, cause one or more processors of a router to:
    receive, from an upstream router, a first message requesting establishment of a label switched path (LSP), wherein the first message includes a tunnel identifier pair comprising a tunnel identifier and an extended tunnel identifier used to uniquely identify the requested LSP;
    compare the tunnel identifier pair for the requested LSP to existing LSP information stored at the router, the existing LSP information including tunnel identifier pairs for one or more existing LSPs; and
    based on a determination that the tunnel identifier pair for the requested LSP is the same as one of the tunnel identifier pairs for one of the existing LSPs, assign a label used by the router to identify incoming traffic associated with the requested LSP that is the same as a previously allocated label for the one of the existing LSPs having the same tunnel identifier pair as the requested LSP.

18. The non-transitory computer-readable medium of claim 17, wherein, to assign the label for the requested LSP, the instructions further cause the one or more processors of the router to assign the label for the requested LSP to be the same as the previously allocated label for the one of the existing LSPs without updating labels in a forwarding table at the router, wherein the forwarding table already includes the previously allocated label for the one of the existing LSPs having the same tunnel identifier pair as the requested LSP.

19. The non-transitory computer-readable medium of claim 17, wherein the instructions further cause the one or more processors of the router to:
    send, to the upstream router, a second message including the assigned label for the requested LSP;
    upon establishment of the requested LSP and tear down of the one of the existing LSPs having the same tunnel identifier pair as the requested LSP, receive, from the upstream router along the requested LSP, traffic including the assigned label; and
    forward, to a downstream router along the requested LSP, the traffic according to a forwarding table at the router based on the assigned label.

20. The non-transitory computer-readable medium of claim 17, wherein the instructions further cause the one or more processors of the router to:
    receive, from the upstream router, a third message requesting establishment of a second LSP, wherein the third message includes a tunnel identifier pair used to uniquely identify the requested second LSP;
    compare the tunnel identifier pair for the requested second LSP to the existing LSP information stored at the router, the existing LSP information including the tunnel identifier pairs for the one or more existing LSPs including the requested first LSP; and
    based on a determination that the tunnel identifier pair for the requested second LSP is not the same as any of the tunnel identifier pairs for the existing LSPs, allocate a second label used to identify incoming traffic associated with the requested second LSP, wherein the second label is different than any previously allocated labels for any of the existing LSPs including the first label for the requested first LSP; and
    update a forwarding table at the router to include the second label for the requested second LSP.

\* \* \* \* \*